United States Patent
Dabral et al.

(10) Patent No.: US 11,284,050 B1
(45) Date of Patent: Mar. 22, 2022

(54) CALIBRATION OF CAMERA AND PROJECTOR

(71) Applicant: TEXAS INSTRUMENTS INCORPORATED, Dallas, TX (US)

(72) Inventors: Shashank Dabral, Allen, TX (US); Jaime Rene De La Cruz Vasquez, Carrollton, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/174,056

(22) Filed: Feb. 11, 2021

Related U.S. Application Data

(60) Provisional application No. 63/079,498, filed on Sep. 17, 2020.

(51) Int. Cl.
  *G03B 21/26* (2006.01)
  *H04N 5/232* (2006.01)
  *H04N 9/31* (2006.01)

(52) U.S. Cl.
  CPC .......... *H04N 9/3176* (2013.01); *G03B 21/26* (2013.01); *H04N 5/23296* (2013.01)

(58) Field of Classification Search
  CPC ............ H04N 5/23296; H04N 9/3176; H04N 2201/0452; H04N 13/327; G03B 21/26; G06T 7/80
  See application file for complete search history.

(56) References Cited

U.S. PATENT DOCUMENTS

2015/0370348 A1\* 12/2015 Slutsky .............. G01B 11/2513
382/154

FOREIGN PATENT DOCUMENTS

DE  102020007613 A1 \* 3/2021 ............ G01C 11/30

OTHER PUBLICATIONS

Hartley, "Epipolar Geometry and the Fundamental Matrix," Second Edition, Multiple View Geometry in Computer Vision, Chpt. 9, Cambridge University Press, Mar. 2004, Cambridge University Press, University Printing House, Shaftesbury Road, Cambridge CB2 8BS UK, 239-261.

(Continued)

*Primary Examiner* — Nelson D. Hernández Hernández
(74) *Attorney, Agent, or Firm* — Michelle F. Murray; Charles A. Brill; Frank D. Cimino

(57) ABSTRACT

Described examples include a system including a projector configured to project a test pattern image, the test pattern image having at least two elements; a camera configured to capture the test pattern image; and a controller coupled to the projector and to the camera. The controller is configured to obtain a first calibration matrix between the projector and the camera for the at least two elements; determine at least two epipolar lines based on the first calibration matrix and the test pattern image; determine a cost function based on the at least two epipolar lines and the at least two elements in the test pattern image as captured by the camera; and determine a second calibration matrix responsive to the cost function, wherein at least one of a camera position of the camera or a projector position of the projector is adjusted responsive to the second calibration matrix.

20 Claims, 10 Drawing Sheets

(56) References Cited

OTHER PUBLICATIONS

Slabaugh, "Computing Euler angles from a rotation matrix," https://www.gregslabaugh.net/publications/euler.pdf (1999), Queen Mary, University of London, Mile End Road, London E1 4NS, 7 pages.
Wolfram, "Euler Angles," https://mathworld.wolfram.com/EulerAngles.html (last updated Jan. 3, 2021) Wolfram Resarch, Inc., 100 Trade Center Drive Champaign, IL 61820-7237 USA, 6 pages.
Wikipedia, "Rotation Matrix," https://en.wikipedia.org/wiki/Rotation_matrix, (Jan. 6, 2021) Wikimedia Foundation, Inc., 1 Montgomery Street, Suite 1600, San Francisco, CA 94104 USA, 37 pages.

\* cited by examiner

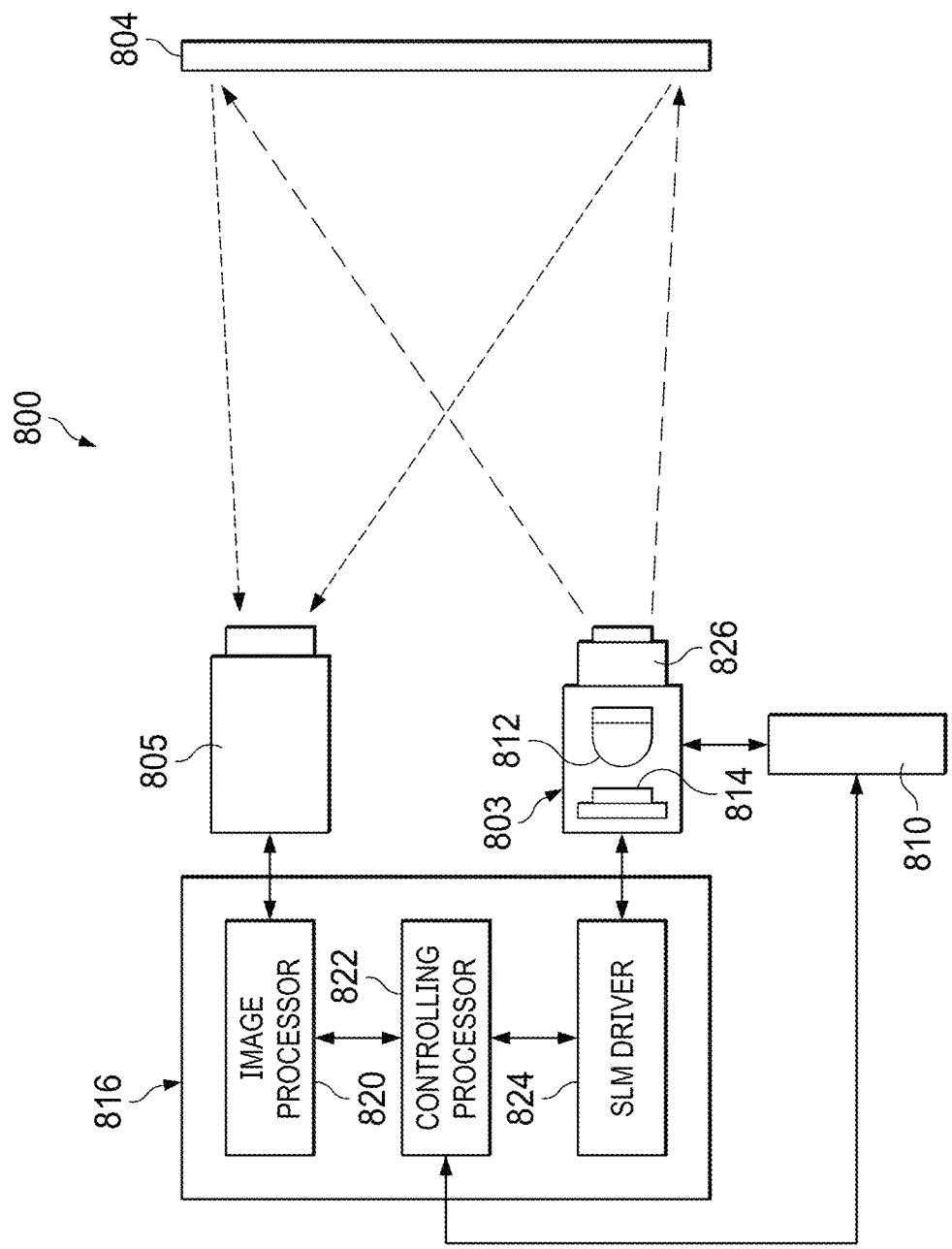

CALIBRATION OF CAMERA AND PROJECTOR

CROSS-REFERENCE TO RELATED APPLICATIONS

This application claims the benefit of and priority to co-owned U.S. Provisional Patent Application No. 63/079,498, filed Sep. 17, 2020, entitled "An Efficient Scheme for Dynamic Calibration of a Projector & Camera Pair," which Application is hereby incorporated herein by reference in its entirety.

SUMMARY

In accordance with an example, a system includes a projector configured to project a test pattern image, the test pattern image including at least two elements. The system also includes a camera configured to capture the test pattern image; and a controller coupled to the projector and to the camera. The controller is configured to obtain a first calibration matrix between the projector and the camera for the at least two elements and determine at least two epipolar lines based on the first calibration matrix and the test pattern image. The controller is also configured to determine a cost function based on the at least two epipolar lines and the at least two elements in the captured test pattern image; and determine a second calibration matrix responsive to the cost function, where the second calibration matrix indicates an adjustment of at least one of a camera position of the camera or a projector position of the projector.

BRIEF DESCRIPTION OF THE DRAWINGS

FIG. 8 is a schematic view of projector system.

DETAILED DESCRIPTION

Figure 1:
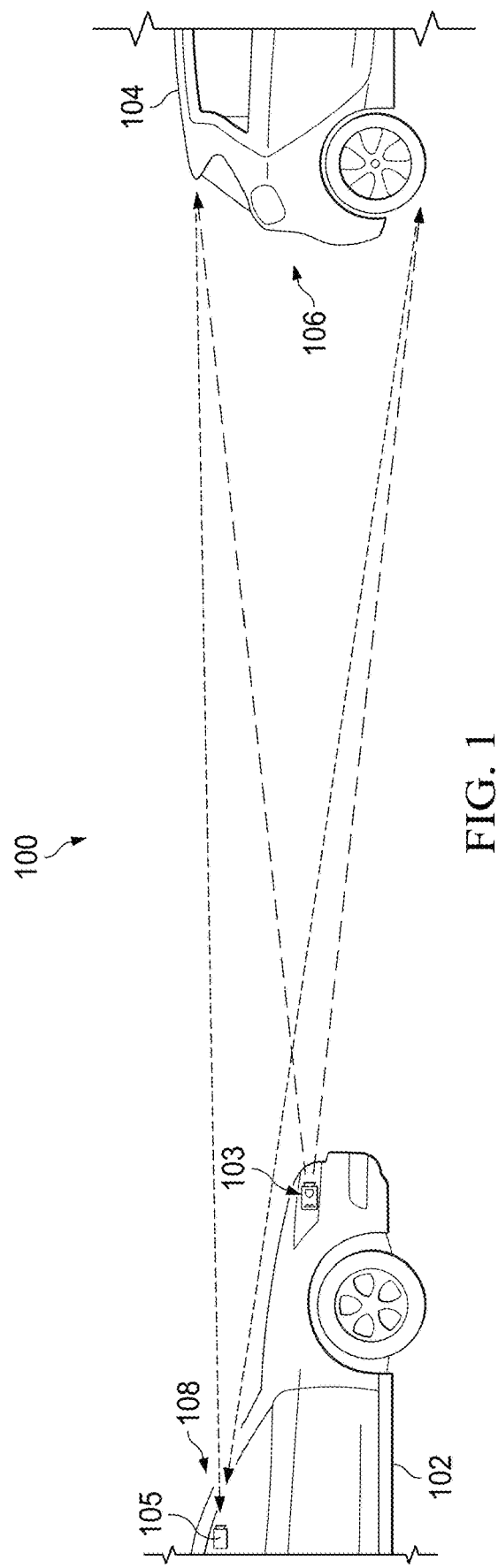
FIG. 1 is a schematic view of a projector system.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled." Elements referred to herein as "optically coupled" are elements that include a connection between the elements that involves transmission of light. Also, as used herein, the terms "on" and "over" may include layers or other elements where intervening or additional elements are between an element and the element that it is "on" or "over."

Projector and camera pairs are used in many applications to provide information and control in many environments. For example, in industrial applications, a projector projects a pattern onto an object. The camera then captures an image of the object with the projected pattern. Analysis of the reflected pattern can then precisely locate the object in multiple dimensions and determine the nature of the object. Automotive applications, such as projector headlights, are another area where camera and projector pairs are useful. Among the uses of projector headlights is providing bright illumination that avoids blinding a driver in a vehicle in front of the projector headlights. A camera determines the shape and position of the vehicle ahead of the projector headlights and then the headlight controller modifies the projected light to avoid the rear window and rear-view mirrors of the vehicle ahead of the projector headlights. However, the pattern of the headlights is aligned to the vehicle in front of the projector headlights. This means that the camera and the projector headlights are aligned to provide the appropriate projected pattern. The initial alignment of the camera and projector is made at the factory and/or at a dealership. However, the motion of the vehicle, bump roads, weather and other factors may cause misalignment while the vehicle is in use. Therefore, it is important to provide a mechanism to align the camera and projector headlights during or after the vehicle being used.

FIG. 1 is a schematic view of a projector system 100. First vehicle 102 includes projector headlights 103 that project projected image 106 onto on object such as second vehicle 104. Camera 105 in first vehicle 102 captures captured image 108 of second vehicle 104. In some cases, when projector headlights 103 are not projecting a specific image, captured image 108 includes second vehicle 104 and the surrounding scene. In other cases, when projector headlights 103 are projecting, captured image 108 includes the projected image 106 overlaid on the image of second vehicle 104. In this example, captured image 108 is used to determine the alignment of the projected image 106. That is, captured image 108 is analyzed to determine areas likely to cause glare in the eyes of the driver of second vehicle 104. Projected image 106 is then modified so that projected image 106 only illuminates areas less likely to cause glare in the eyes of the driver of second vehicle 104.

Figure 2:
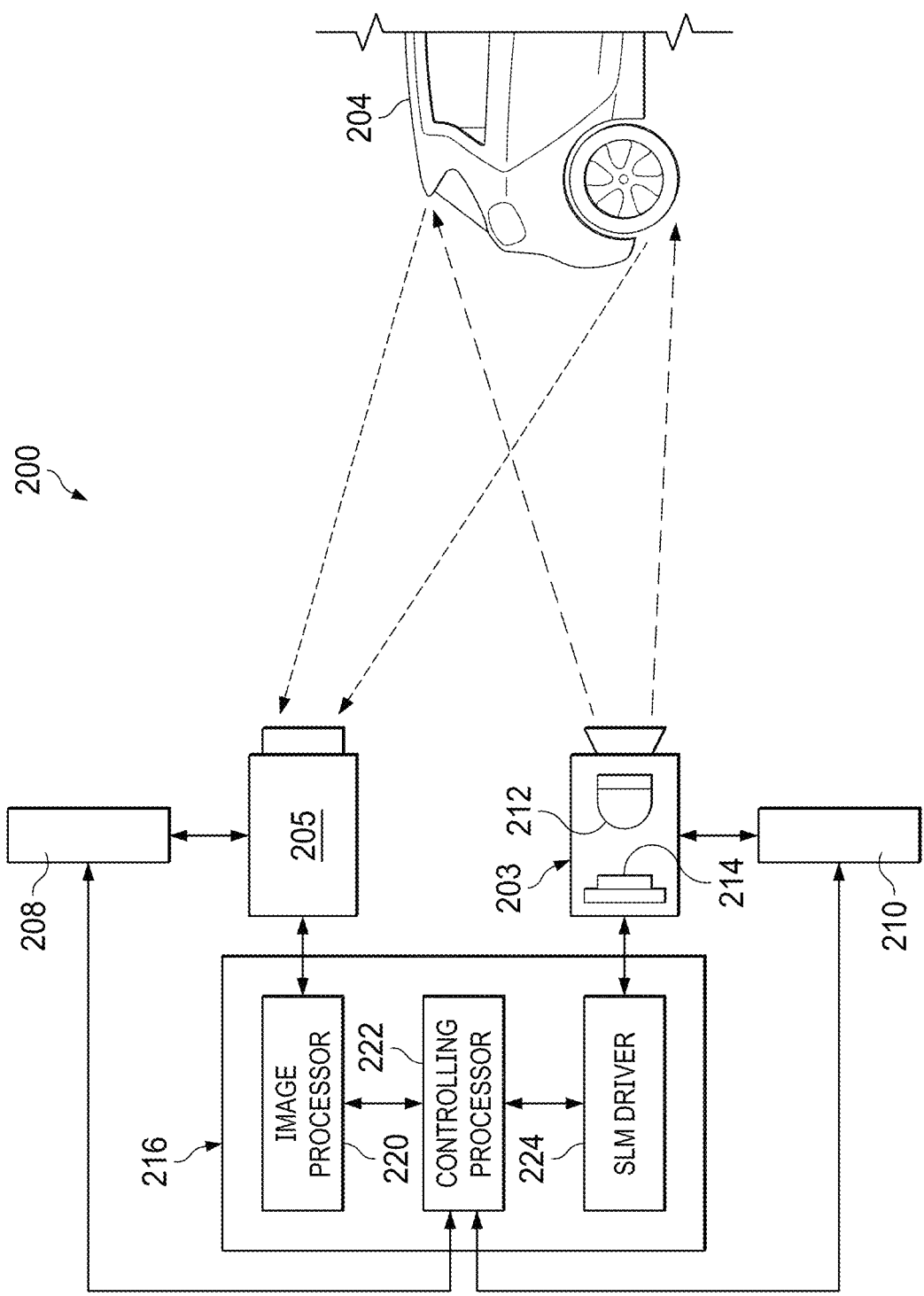
FIG. 2 is a schematic view of projector system.

FIG. 2 is a schematic view of projector system 200. Camera 205 is an example of camera 105 (FIG. 1). First adjuster 208 can adjust the position of camera 205. In an example, camera 205 mounts at the top of the windshield of first vehicle 102 (FIG. 1). Projector headlight 203 is an example of projector headlights 103 (FIG. 1). Projector headlight 203 includes light source 212. In this example, light source 212 is an array of light emitting diodes (LEDs). In other examples, light source 212 is an incandescent light, an array of laser diodes, or another suitable source. Using optics (not shown), the light from light source 212 is homogenized and directed to spatial light modulator 214. In this example, spatial light modulator 214 is a digital micromirror device (DMD). In other examples, spatial light modulator is another type of spatial light modulator, such as a liquid crystal on silicon (LCOS) device. In this example, spatial light modulator 214 has an array of micromirrors that modulate the light provided from light source 212 on a pixel-by-pixel basis. Controller 216 provides a digital image to spatial light modulator 214 so that light modulated by spatial light modulator 214 forms a desired image, such as glare free illumination or an image such as a turn arrow to provide directions to the driver of first vehicle 102 (FIG. 1). Projector headlight 203 includes a second adjuster 210 to adjust the position of projector headlight 203. In an example, first adjuster 208 and second adjuster 210 each include servo motors to precisely position camera 205 and projector headlight 203, respectively. In an example, a vehicle, such as first vehicle 102, includes two projector headlights at the front of the vehicle at both sides (i.e., left and right headlights).

In an example, controller 216 analyzes an image captured by camera 205 to determine what object is ahead of first vehicle 102 (FIG. 1). Controller 216 includes an image processor 220 that receives image data from camera 205 and performs mathematical processing on the image data. Controller 216 also includes controlling processor 222 that controls the operation of the components of controller 216 and communicates with other devices. Controlling processor 222 also controls the operation of adjuster 208 and adjuster 210. Controller 216 also includes a spatial light modulator (SLM) driver 224 that receives operational instructions from controlling processor 222 and provides signals to projector headlight 203. If controller 216 detects another vehicle, such as second vehicle 204, controller 216 analyzes the image to determine areas of the vehicle where light might cause glare in the eyes of the driver of second vehicle 204. Controller 216 then provides an image to spatial light modulator 214 that excludes light from those areas that might cause glare. However, to provide the desired result, the image received by camera 205 must be aligned to the projected image of projector headlight 203. During manufacturing and maintenance, camera 205 and projector headlight 203 are aligned. However, mechanical stress and weather may cause misalignment with the use of first vehicle 102.

Figure 3:
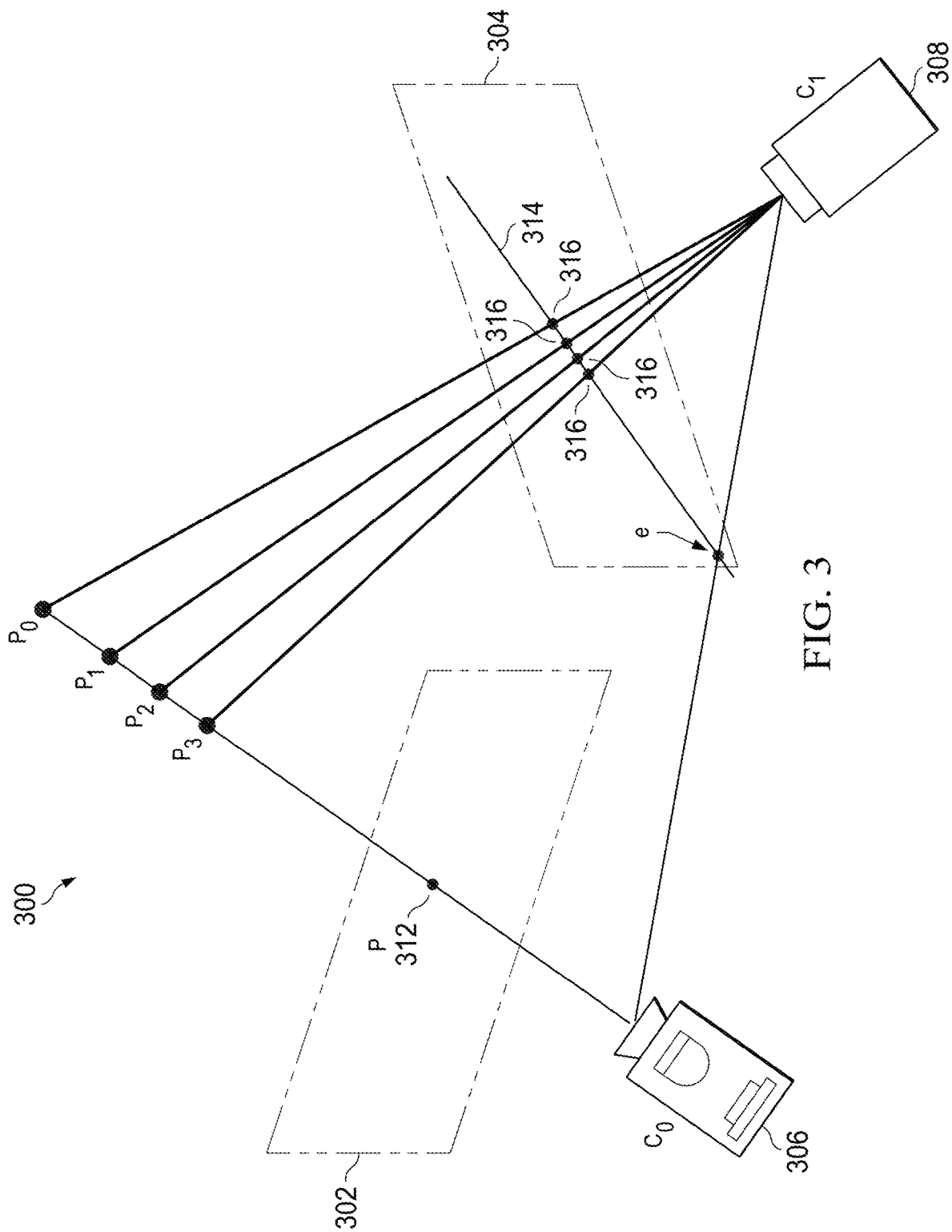
FIG. 3 is a schematic diagram of a camera and projector system.

FIG. 3 is a schematic diagram of a camera and projector system 300. Projector plane 302 shows the orientation of an example projector 306 ($C_0$), such as projector headlight 203 (FIG. 2). That is, projector plane 302 shows the orientation of the projector 306, and is orthogonal to the direction of projection. Camera plane 304 shows the orientation of an example camera 308 (C1), such as camera 205 (FIG. 2). That is, camera plane 304 shows the orientation of the camera 308. The camera plane 304 is the image plane of the camera 308. The pictured skew between projector plane 302 and camera plane 304 is high for illustration purposes. The distance at which an element of the image P will impact an object is unknown. It may be at P0, P1, P2, or P3, for example. Therefore, the image of image P may be present at any one of example points 316 in camera plane 304. However, epipolar geometry says that an image element at its original point 312 in the projection plane will fall on points 316 on an epipolar line 314. An epipolar line is the straight line of intersection of the epipolar plane with the image plane. The epipolar plane is a plane having the points $C_0$, $C_1$ and the point P where it is projected (i.e., one of $P_0$-$P_3$) in the plane. Epipolar line 314 is determined mathematically using the Essential Matrix, which is determined from the relative positions of projector plane 302 and camera plane 304 and the position of the epipole e. The epipole e is where a line from $C_0$ to $C_1$ intersects the camera plane 304. (See, e.g., Hartley and Zisserman, Multiple View Geometry in Computer Vision, Chpt. 9.6 "The Essential Matrix," Second Edition, Cambridge University Press, March 2004, which is hereby incorporated herein by reference in its entirety.) Therefore, if the image P occurs in camera plane 304 away from the epipolar line 314, either the camera or the projector have moved from the positions where the Essential Matrix was determined.

Figure 4:
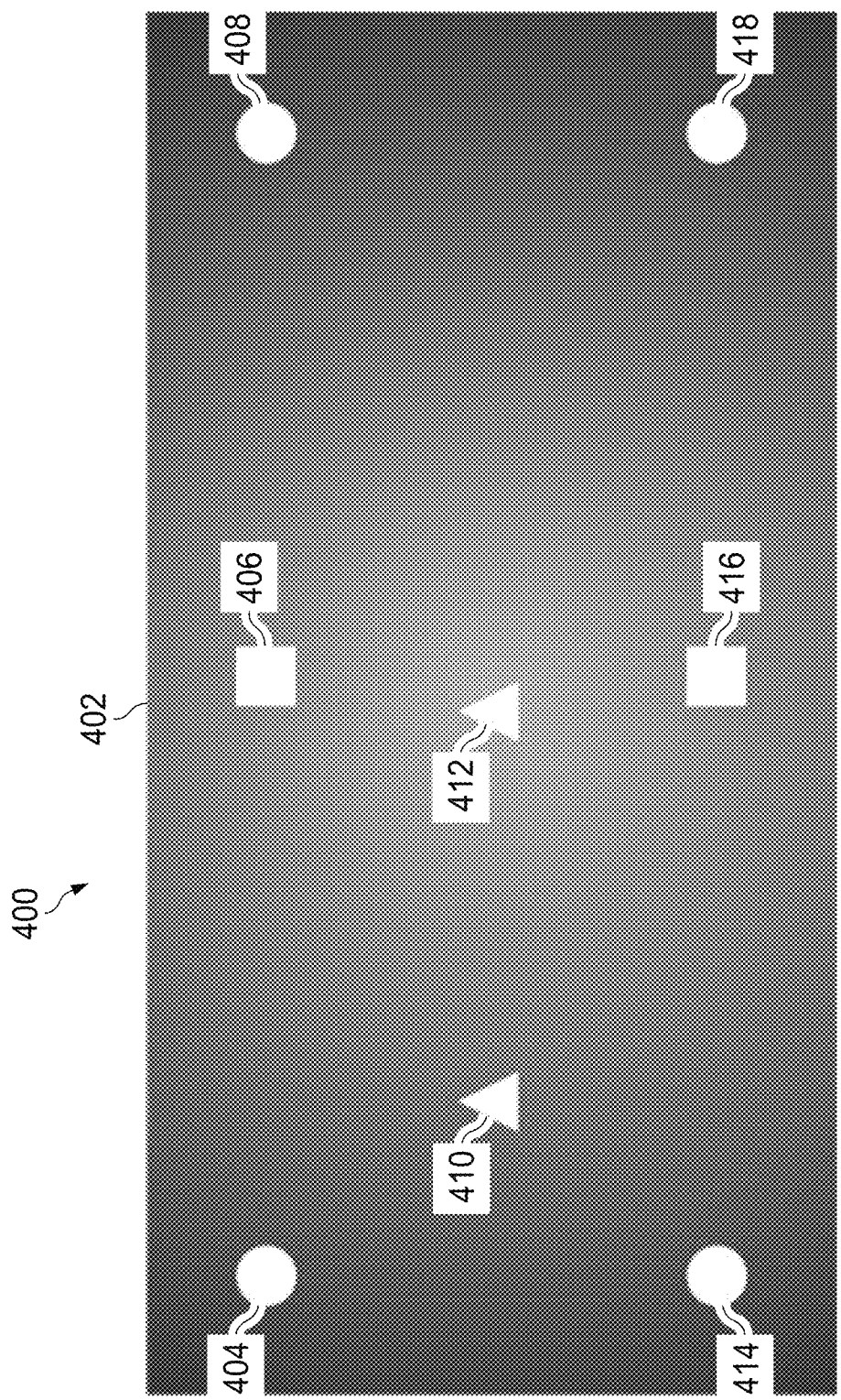
FIG. 4 is an example test pattern image.

FIG. 4 is an example test pattern image 400. Test pattern image 400 is projected by a projector, such as projector headlight 203 (FIG. 2) during an alignment procedure as describe hereinbelow with regard to FIG. 7. In an example, an image 402 includes simple identifiable patterns such circle 404, square 406, circle 408, triangle 410, triangle 412, circle 414, square 416, and circle 418. These geometric patterns are distributed about image 402 and are chosen to allow for easy recognition even after the image 402 has been projected onto an object. In other examples, other patterns and other positions are used.

Figure 5:
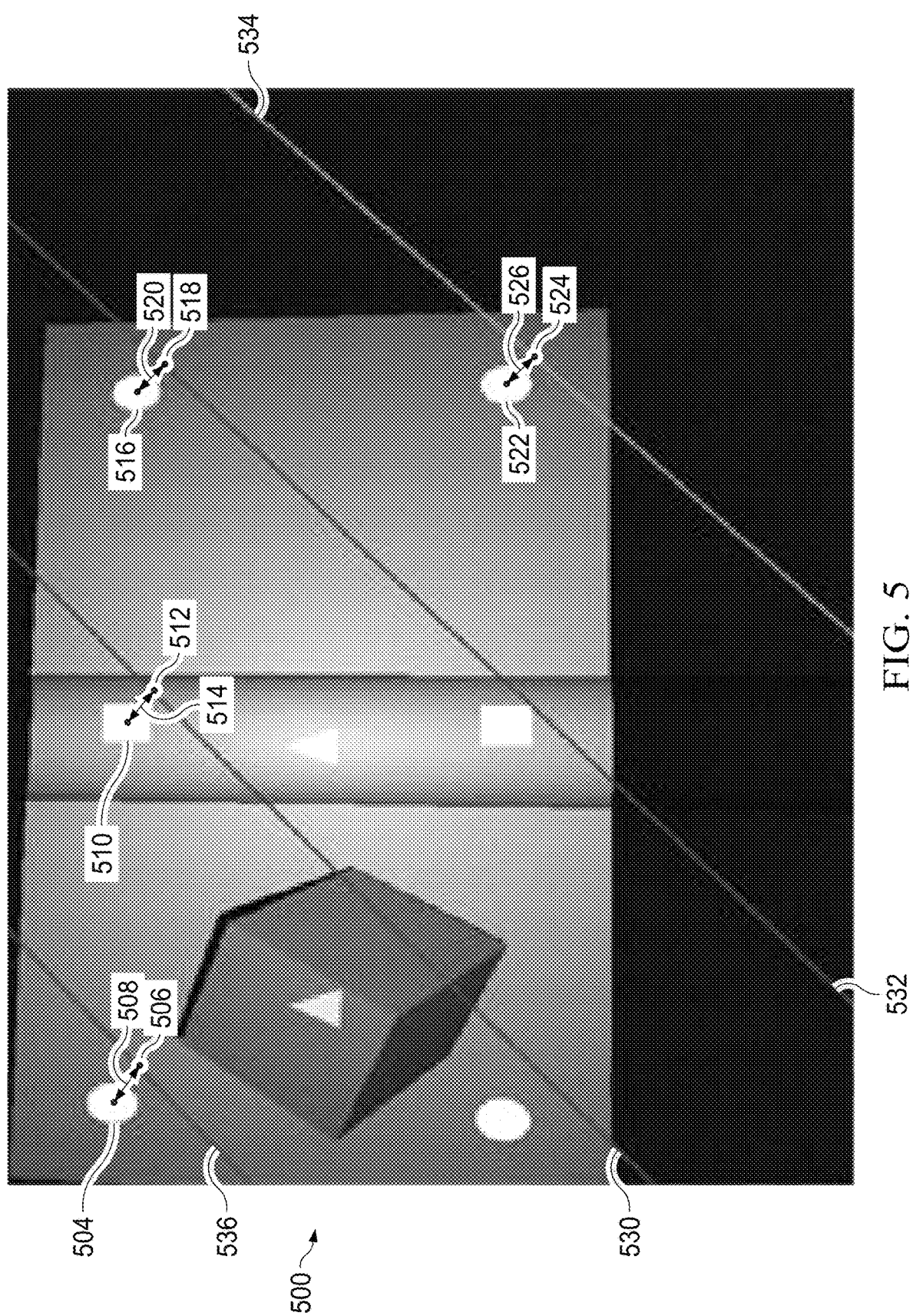
FIG. 5 is an example image.

FIG. 5 is an example image 500. Image 500 is an image of test pattern image 400 (FIG. 4) as projected onto an object or objects. These objects distort test pattern image 400 (FIG. 4). However, at least some of the objects can be detected electronically by a controller, such as controller 216 (FIG. 2). The centroid of each of the detected identifiable patterns or objects is determined and an epipolar line is determined for the centroid of each discerned object from the projected image and the Essential Matrix. At this initial stage, the Essential matrix corresponds to a calibration matrix. For example, first epipolar line 536 is determined for first object 504, second epipolar line 530 is determined for second object 510, third epipolar line 532 is determined for third object 516, and fourth epipolar line 534 is determined for fourth object 522. In this example, no other objects are determined in FIG. 5 because four is adequate to determine a misalignment. In other examples, more or fewer objects are used to determine misalignment. In this example, the objects are chosen randomly from the recognized objects. In other examples, the objects may be chosen algorithmically by spacing between the recognized objects or another parameter, such as the confidence of the recognition of each object.

For each object, a line perpendicular to the epipolar line is generated between the object and the epipolar line. For example, a line in any two-dimensional system (such as camera plane 304 (FIG. 3) can be defined by Equation 1:

$$ax+by+c=0 \qquad (1)$$

where a is the slope relative to the x axis, b is the slope relative to the y axis and c is a shift from the origin. The shortest distance from the epipolar line to its object is determined by Equation 2:

$$\frac{|ax + by + c|}{\sqrt{a^2 + b^2}}. \qquad (2)$$

In FIG. 5, the first misalignment distance 508 is the distance from first object 504 to the nearest point on the epipolar line to the first object, which is first epipolar intersection 506. The second misalignment distance 514 is the distance from second object 510 to the second epipolar intersection 512. The third misalignment distance 520 is the distance from third object 516 to the third epipolar intersection 518. The fourth misalignment distance 526 is the distance from fourth object 522 to the fourth epipolar intersection 524.

From this information, a cost function is determined using Equation 3:

$$\sum_{i=1}^{i=n} \frac{|a_i x_i + b_i y_i + c_i|}{\sqrt{(a_i^2 + b_i^2)}} \qquad (3)$$

where n is the number of objects identified. Equation 3 produces a normalized summation of the distances from the objects and their respective epipolar line. The next step is to determine an adjustment to the calibration matrix/pose between the projector plane 302 (FIG. 3) and the camera plane 304 (FIG. 3). The calibration matrix has the form of matrix 4:

$$\begin{bmatrix} r11 & r12 & r13 \\ r21 & r22 & r23 \\ r31 & r32 & r33 \end{bmatrix} \begin{bmatrix} t_x \\ t_y \\ t_z \end{bmatrix} \quad (4)$$

where the left side is a composite rotation matrix and t is translation matrix. The composite rotation matrix is derived from the Euler angles as described hereinbelow. (See Slabaugh, "Computing Euler angles from a rotation matrix," https://www.gregslabaugh.net/publications/euler.pdf (1999), Wolfram, "Euler Angles, https://mathworld.wolfram.com/EulerAngles.html (last updated Jan. 3 2021), or Wikipedia, "Rotation Matrix," https://en.wikipedia.org/wiki/Rotation_matrix, (Jan. 6, 2021), which are hereby incorporated herein by reference in their entirety). Because the distance from the camera 205 (FIG. 2) and the projector headlight 203 (FIG. 2) is fixed, it is assumed that the transition matrix is constant. If this assumption is not valid, ranges of $t_x$, $t_y$, and $t_z$ will also be applied along with the Euler angles discussed hereinbelow. The rotation matrix is a composite of three rotation matrices $R(\theta_y)$, $R(\theta_x)$, and $R(\theta_z)$ about the y, x, and z axes, respectively, using Equation 5:

$$R = R(\theta_y) R(\theta_x) R(\theta_z) \quad (5)$$

where $\theta_y$, $\theta_x$, and $\theta_z$ are the Euler angles of the relative positions of the camera and projector. In an example, $\theta_y$, $\theta_x$, and $\theta_z$ are rotational parameters. The three rotation matrixes have the format:

$$R(\theta_x) = \begin{bmatrix} 1 & 0 & 0 \\ 0 & \cos\theta_x & -\sin\theta_x \\ 0 & \sin\theta_x & \cos\theta_x \end{bmatrix} \quad (6)$$

$$R(\theta_y) = \begin{bmatrix} \cos\theta_y & 0 & \sin\theta_y \\ 0 & 1 & 0 \\ -\sin\theta_y & 0 & \cos\theta_y \end{bmatrix} \quad (7)$$

$$R(\theta_x) = \begin{bmatrix} \cos\theta_z & -\sin\theta_z & 0 \\ \sin\theta_z & \cos\theta_z & 0 \\ 0 & 0 & 1 \end{bmatrix}. \quad (8)$$

(See Slabaugh, Wolfram and Wikipedia cited above.) Solving for the Euler angles yields Equations 9-11:

$$\theta_y = \tan^{-1}(-r31/\sqrt{r11^2 + r21^2}) \quad (9)$$

$$\theta_x = \tan^{-1}(r21/r11) \quad (10)$$

$$\theta_z = \tan^{-1}(r32/r33) \quad (11)$$

These Euler angles are the result of resolving the rotation matrix R of Matrix 4.

To determine a correction factor to correct a misalignment like that shown in FIG. 5, a controller such as controller 216 (FIG. 2) uses controlling processor 222 (FIG. 2) or image processor 220 (FIG. 2) to determine $\theta_y$, $\theta_x$, and $\theta_z$ for the current calibration matrix or a preset matrix. Then, $\theta_y$, $\theta_x$, and $\theta_z$ are varied over a range. An example range of $\theta_y$, $\theta_x$, and $\theta_z$ of is ±10%. Within that range, every combination of $\theta_y$, $\theta_x$, and $\theta_z$ is used to determine revised epipolar lines, such as epipolar lines 530, 532, 534, and 536. A cost for each of these combinations is determined using Equation 3. If a cost function is below a preset threshold, the combination of $\theta_y$, $\theta_x$, and $\theta_z$ that provides the lowest cost function is chosen for the revised calibration matrix/pose. If transition factors $t_x$, $t_y$, and $t_z$ are to be included along with rotation, ranges of $t_x$, $t_y$, and $t_z$ will also be applied along with the Euler angles discussed and a lowest cost is determined with these values included.

Figure 6:
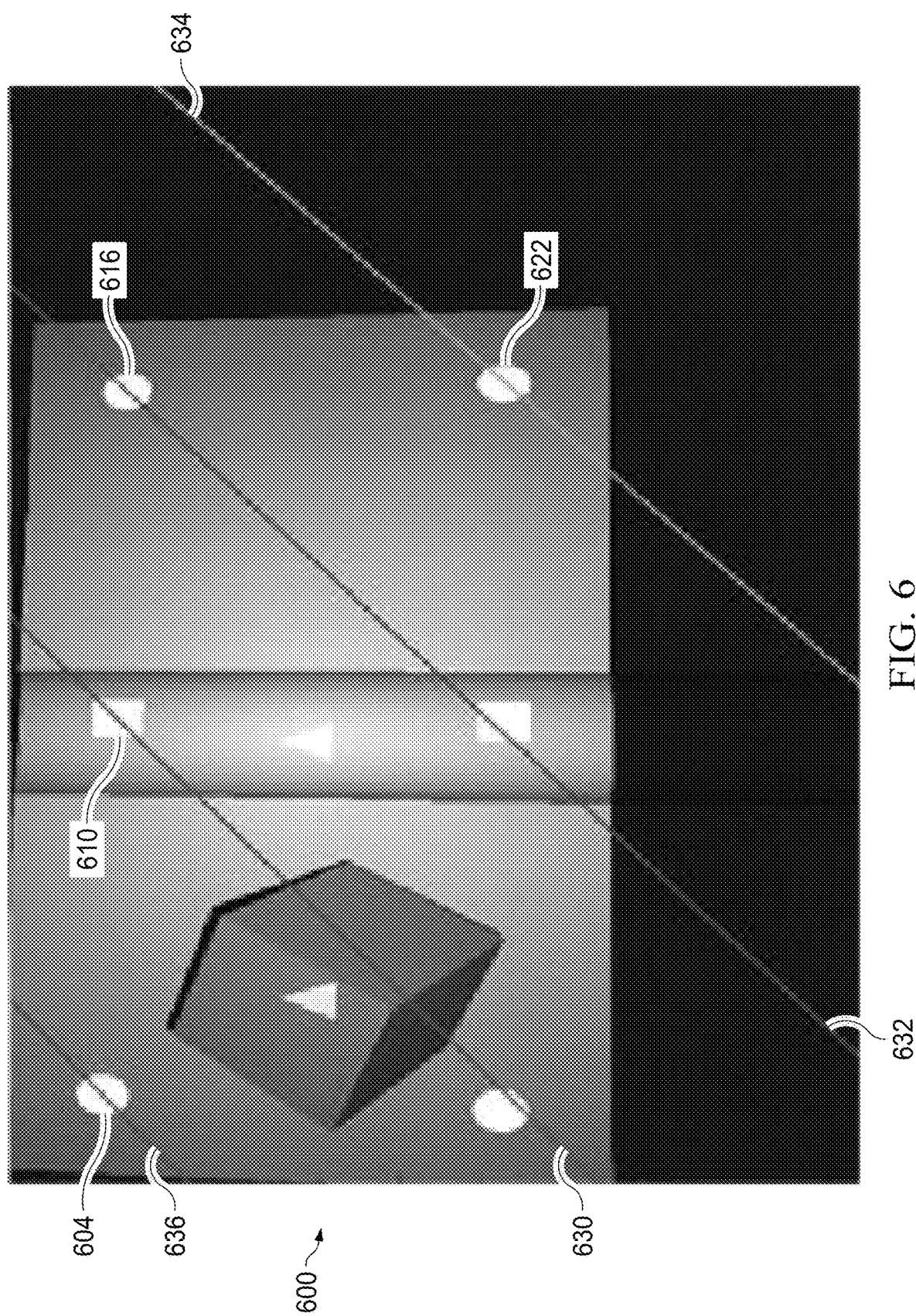
FIG. 6 is an example image.

FIG. 6 is an example image 600. In FIG. 6, the revised calibration matrix has been applied to image 600. Thus, first epipolar line 636, second epipolar line 630, third epipolar line 632 and fourth epipolar line 634 go directly through first object 604, second object 610, third object 616 and fourth object 622, respectively. In an example, first adjuster 208 (FIG. 2) and/or second adjuster 210 (FIG. 2) then move either one or both of projector headlight 203 (FIG. 2) and camera 205 (FIG. 2) according to the difference between the current calibration matrix and the revised calibration matrix. In another example, a correction matrix is determined that is the difference between current calibration matrix and the revised calibration matrix. This correction matrix is applied to images captured by camera 205 (FIG. 2) until the next calibration. However, in some use-cases, it is necessary to physically adjust projector headlight 203 (FIG. 2).

Figure 7A:
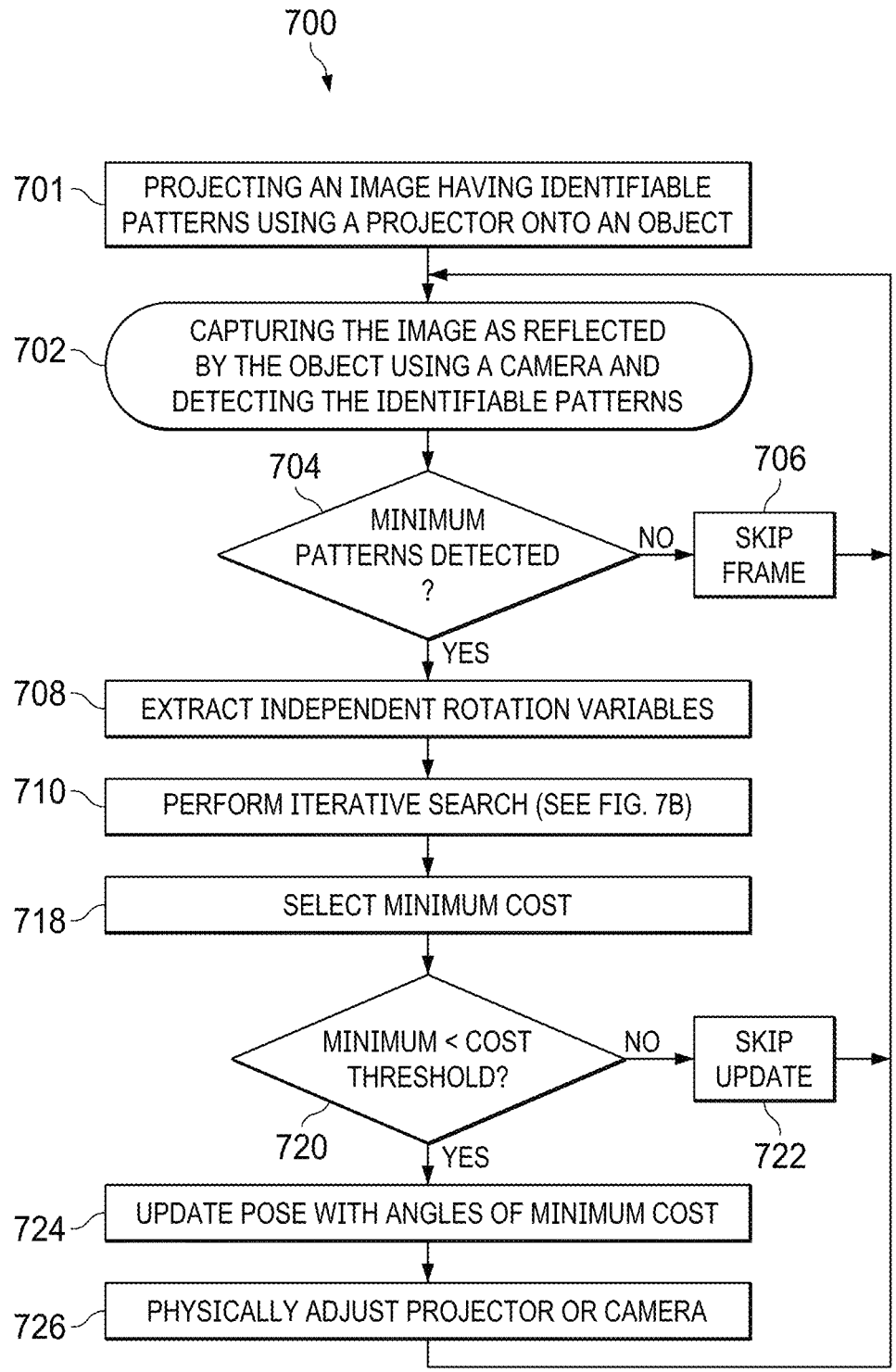
FIGS. 7A and 7B (collectively "FIG. 7") are flow diagrams of a process.
Figure 7B:
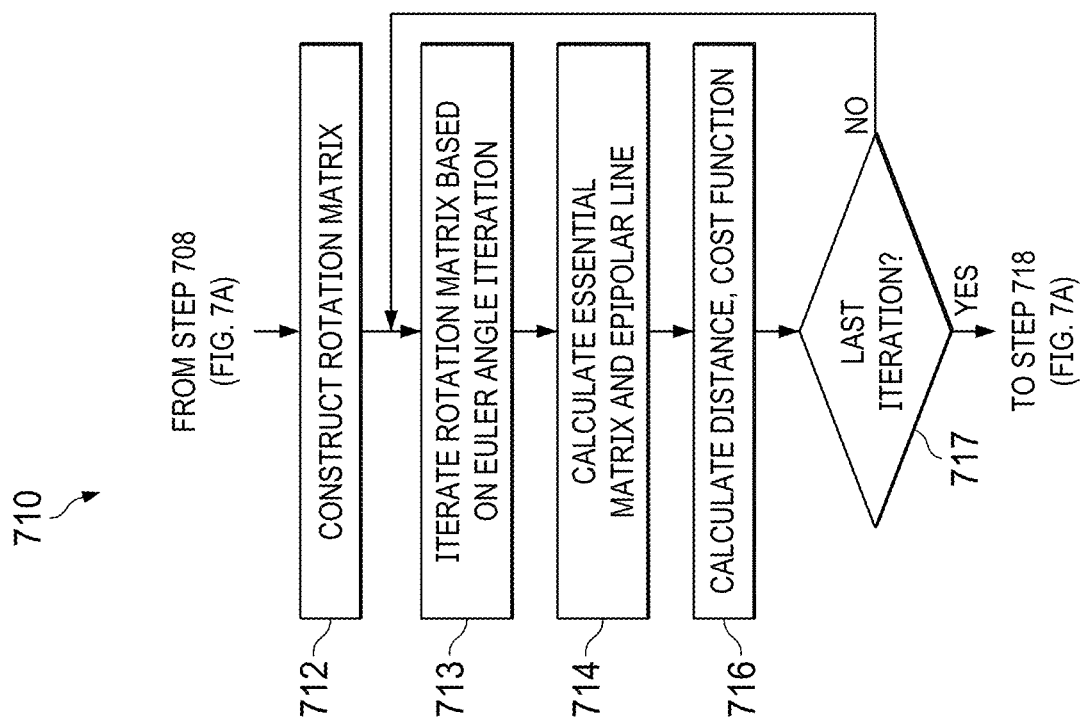

FIGS. 7A and 7B (collectively "FIG. 7") are flow diagrams of a process 700. Step 701 is projecting an image having identifiable patterns, using a projector, onto an object. An example of a projector is projector headlight 203 (FIG. 2). Step 702 is capturing the image as reflected by the object using a camera and detecting the identifiable patterns. An example of a camera is camera 205 (FIG. 2). Step 704 is determining whether a minimum number of patterns is detected. If a minimum number of patterns is not detected, step 706 is skipping the current frame captured by camera 205 (FIG. 2) and returning to step 702. If step 704 determines that a number of patterns detected is above the minimum, step 708 is extracting the independent rotation variables (i.e., $\theta_y$, $\theta_x$, and $\theta_z$) from a calibration matrix based on a relative position of the projector and the camera. Step 710 is performing an iterative search varying the independent variables.

Step 710 is shown in detail in FIG. 7B. Step 712 is constructing a rotation matrix based on the independent variables. Step 713 is to iterate the rotation matrix based on the Euler Angle Iteration of $\theta_y$, $\theta_x$, and $\theta_z$. Step 714 is calculating an Essential matrix and the appropriate epipolar lines for the iterated rotation matrix. Step 716 is calculating a distance cost function based the epipolar lines for this iteration. Step 717 is determining if the last iteration has been completed. If the last iteration has not been completed, then the process loops back to step 713. If the last iteration has been completed, the process goes to step 718 of FIG. 7A.

Returning to FIG. 7A, step 718 is selecting the iteration having minimum cost. Step 720 determines whether the minimum cost is below a predetermined threshold. If the minimum cost is not below the predetermined threshold, step 722 is to skip the update and return to step 702. This is to reject any spurious calculation, such as negative numbers. If the minimum cost is below the predetermined threshold, step 724 is updating the pose (calibration matrix) with the angles of the minimum cost iteration. The calibration matrix indicates an adjustment of at least one of a camera position of the camera or a projector position of the projector. The processor initiates adjustment of at least one of the camera position or the projector position. Step 726 is physically adjusting, using the adjuster, the projector or the camera in accordance with the selected iteration.

FIG. 8 is a schematic view of projector system 800. Camera 805 is an example of camera 105 (FIG. 1). Projector 803 includes light source 812. In this example, light source 812 is an array of light emitting diodes (LEDs). In other examples, light source 812 is an incandescent light, an array of laser diodes, or another suitable source. Using optics (not shown), the light from light source 812 is homogenized, separated into basic colors, and directed to spatial light modulator 814. Although shown as one modulator, there may be two or three spatial light modulators. In an example, spatial light modulator is three separate spatial light modulators, one for each of three colors. In another example, light source 812 provides the separate colors at different times by controlling the on times of different color LEDs or using a phosphor color wheel or a static phosphor, for example. In this example, spatial light modulator 814 is one or two spatial light modulators. In an example, spatial light modulator 814 is a DMD. In other examples, spatial light modulator is another type of spatial light modulator, such as a liquid crystal on silicon (LCOS) device. A DMD has an array of micromirrors that modulate the light provided from light source 812 on a pixel-by-pixel basis. Controller 816, using spatial light modulator (SLM) driver 824, provides a digital image to spatial light modulator 814 so that light modulated by spatial light modulator 814 displays the image. Projector 803 includes an adjuster 810 to adjust the orientation, the zoom and/or focal length of projection optics 826 in projector 803. In an example, adjuster 810 each includes servo motors.

In an example, controller 816 analyzes an image captured by camera 805 of the image projected on screen 804 using image processor 820 under the control of controlling processor 822. When adjusting the zoom or focal length of projector 803 manually, the focal length can become maladjusted. This shows as a shift of elements on the image. A projector, such as projector 803 shows an image such as image 402 on screen 804. Controller 816 determines epipolar lines for each captured object in the image. For example, first epipolar line 536 (FIG. 5) is determined for first object 504 (FIG. 5), second epipolar line 530 (FIG. 5) is determined for second object 510 (FIG. 5), third epipolar line 532 (FIG. 5) is determined for third object 516 (FIG. 5), and fourth epipolar line 534 (FIG. 5) is determined for fourth object 522 (FIG. 5). If the focal length is improperly adjusted, a cost function, such as Equation 3 will have a value greater than one. The focal length is then iteratively adjusted over a predetermined range with a cost function determined for each iteration. The iteration with the lowest cost function is then selected to set the focal length. The controller determines a calibration matrix, which indicates an adjustment to at least one of the projector 803 or the camera 805. The controller instructs an adjuster, such as adjuster 810, to adjust at least one of the projector 803 or the camera 805.

Figure 9:
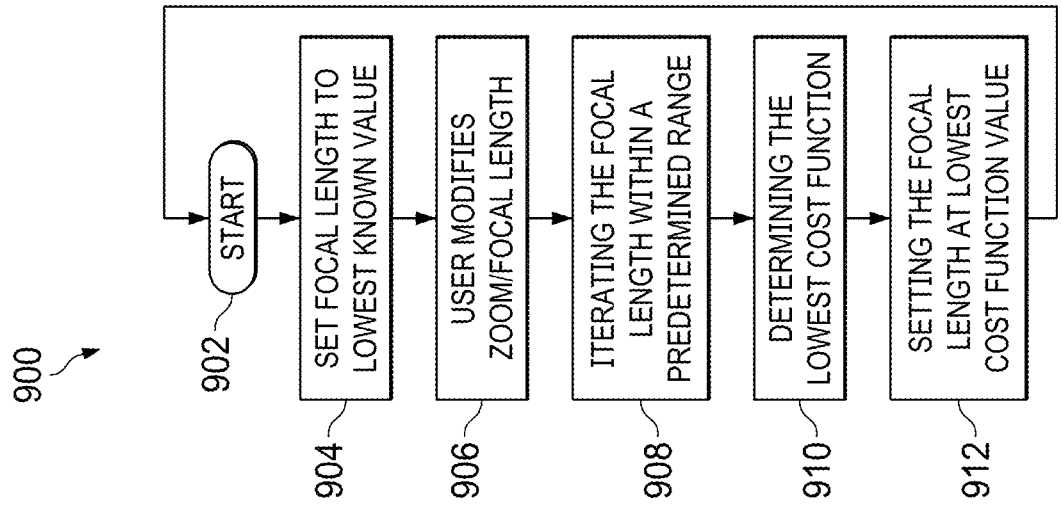
FIG. 9 is a flow diagram of a process.

FIG. 9 is a flow diagram of a process 900. Step 902 starts the process. Step 904 is setting focal length of a projector to a lowest known value. Projector 803 (FIG. 8) is an example projector. Step 906 is modifying the zoom/focal length of the projector. Step 908 is iterating the focal length within a predetermined range. That is, within a predetermined range of focal lengths, the focal length is incremented and the cost function for that focal length is determined. This is repeated until the cost function for the increments within the range are determined. Step 910 is determining the lowest cost function. Step 912 is setting the focal length at lowest cost function value. Process 900 then loops back to step 902, in this example. Therefore, the process of FIG. 9 provides continuous focal length correction. In other examples, process 900 is called whenever the user determines that improved focus is warranted or at programmed predetermined intervals.

Figure 10:
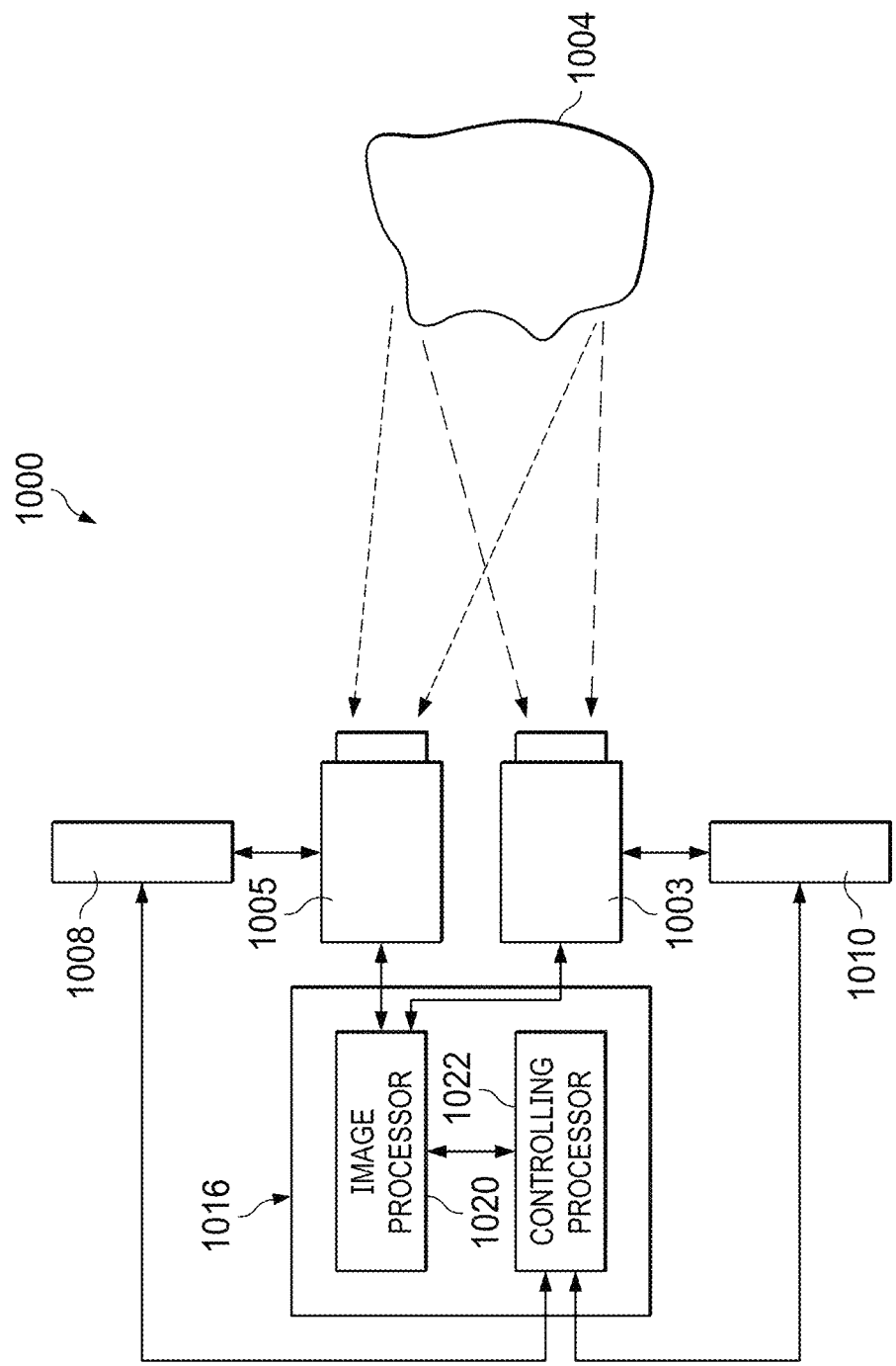
FIG. 10 is a schematic diagram of an example optical device.

FIG. 10 is a schematic diagram of an example optical device 1000. Camera 1003 and camera 1005 receive images of object 1004. In an example, camera 1003 and camera 1005 are part of a depth detection system. To accurately determine the distance to object 1004, camera 1003 and camera 1005 are aligned. One of camera 1003 and camera 1005 is selected as the reference camera. The reference camera captures a reference image that includes object 1004, for example. Controller 1016 then analyzes the reference image using image processor 1020 under the control of controlling processor 1022. For example, the reference image is scanned for a group of predetermined image elements, such as squares, crosses, circles, etc. If any of the predetermined image elements is found, the process of FIGS. 3-7 is applied to the image received by the other camera using controller 1016. This determines a lowest cost adjustment to an alignment matrix between camera 1003 and camera 1005. The lowest cost adjustment is then used to correct the alignment between camera 1003 and camera 1005 using first adjuster 1008 and/or second adjuster 1010.

Modifications are possible in the described examples, and other examples are possible, within the scope of the claims.

What is claimed is:

1. A system comprising:
   a projector configured to project a test pattern image, the test pattern image comprising at least two elements;
   a camera configured to capture the test pattern image; and
   a controller coupled to the projector and to the camera, the controller configured to:
   obtain a first calibration matrix between the projector and the camera for the at least two elements;
   determine at least two epipolar lines based on the first calibration matrix and the test pattern image;
   determine a cost function based on the at least two epipolar lines and the at least two elements in the captured test pattern image; and
   determine a second calibration matrix responsive to the cost function, wherein the second calibration matrix indicates an adjustment of at least one of a camera position of the camera or a projector position of the projector.

2. The system of claim 1, wherein determining the cost function comprises determining a first distance between a first epipolar line of the at least two epipolar lines and a first element of the at least two elements and determining a second distance between a second epipolar line of the at least two epipolar lines and a second element of the at least two elements.

3. The system of claim 1, wherein a second cost function of the second calibration matrix is lower than a first cost function of the first calibration matrix.

4. The system of claim 1, further comprising:
   an adjuster coupled to the projector, the adjuster configured to adjust a position of the projector responsive to the second calibration matrix.

5. The system of claim 1, further comprising:
   an adjuster coupled to the camera, the adjuster configured to adjust a position of the camera responsive to the second calibration matrix.

6. The system of claim 1, wherein the cost function is a normalized summation of distances from the at least two elements and corresponding epipolar lines of the at least two epipolar lines.

7. The system of claim 1, wherein the projector is a projector headlight.

8. The system of claim 1, wherein the second calibration matrix corresponds to a lowest cost of the cost function.

9. The system of claim 8, wherein the lowest cost is determined by varying rotational parameters of the first calibration matrix over at least two iterations, determining a cost of the cost function for the at least two iterations, and selecting the iteration having the lowest cost.

10. A vehicle comprising:
   a projector headlight configured to project a test pattern image, the test pattern image comprising at least two elements;
   a camera configured to capture the test pattern image; and
   a controller coupled to the projector headlight and to the camera, the controller configured to:
      obtain a first calibration matrix between the projector headlight and the camera for the at least two elements;
      determine at least two epipolar lines based on the first calibration matrix and the test pattern image;
      determine a cost function based on the at least two epipolar lines and the at least two elements in the captured test pattern image; and
      determine a second calibration matrix responsive to the cost function, wherein the second calibration matrix indicates an adjustment of at least one of a camera position of the camera or a projector headlight position of the projector headlight.

11. The vehicle of claim 10, wherein determining the cost function comprises determining a first distance between a first epipolar line of the at least two epipolar lines and a first element of the at least two elements and determining a second distance between a second epipolar line of the at least two epipolar lines and a second element of the at least two elements.

12. The vehicle of claim 10, wherein the cost function is a first cost function and a second cost function of the second calibration matrix is lower than the first cost function of the first calibration matrix.

13. The vehicle of claim 10, wherein the cost function is a normalized summation of distances from the at least two elements and corresponding epipolar lines of the at least two epipolar lines.

14. The vehicle of claim 10, wherein the second calibration matrix corresponds to a lowest cost of the cost function.

15. The vehicle of claim 14, wherein the lowest cost is determined by varying rotational parameters of the first calibration matrix over at least two iterations, determining a cost of the cost function for the at least two iterations and selecting the iteration having the lowest cost.

16. The vehicle of claim 10, further comprising:
   an adjuster coupled to the projector headlight, the adjuster configured to adjust a position of the projector headlight responsive to the second calibration matrix.

17. The vehicle of claim 10, further comprising:
   an adjuster coupled to the camera, the adjuster configured to adjust a position of the camera responsive to the second calibration matrix.

18. A controller comprising:
   a processor, the processor configured to:
      instruct a projector to project a projected image having patterns;
      receive a captured image of the projected image from a camera;
      detect the patterns in the captured image;
      extract independent rotation variables from a calibration matrix based on a relative position of the projector and the camera;
      perform an iterative search varying the independent rotation variables, each iteration comprising:
         constructing a rotation matrix based on the independent rotation variables;
         calculating an Essential matrix and epipolar lines based on the rotation matrix; and
         calculating a cost function;
      select a selected iteration having a low cost function; and
      initiate adjustment of at least one of the projector or the camera in accordance with the selected iteration.

19. The controller of claim 18, wherein the cost function is a normalized summation of distance from the detected patterns and the epipolar lines.

20. The controller of claim 18, the processor is further configured to determine whether the low cost is below a predetermined threshold.

* * * * *